United States Patent
Sauser et al.

(10) Patent No.: US 8,915,375 B2
(45) Date of Patent: Dec. 23, 2014

(54) VIBRATING SCREEN SUSPENSION SYSTEMS

(75) Inventors: Edwin J. Sauser, Monticello, IA (US); Jason Kreider, Howell, MI (US)

(73) Assignee: Terex USA, LLC, Westport, CT (US)

(*) Notice: Subject to any disclaimer, the term of this patent is extended or adjusted under 35 U.S.C. 154(b) by 377 days.

(21) Appl. No.: 13/290,753

(22) Filed: Nov. 7, 2011

(65) Prior Publication Data

US 2012/0111774 A1 May 10, 2012

Related U.S. Application Data

(60) Provisional application No. 61/411,120, filed on Nov. 8, 2010, provisional application No. 61/485,204, filed on May 12, 2011, provisional application No. 61/522,016, filed on Aug. 10, 2011.

(51) Int. Cl.
*B07B 1/42* (2006.01)
*B07B 1/28* (2006.01)
*B07B 1/46* (2006.01)
*F16F 15/067* (2006.01)

(52) U.S. Cl.
CPC ... *B07B 1/46* (2013.01); *B07B 1/28* (2013.01); *F16F 15/067* (2013.01)
USPC ........................................ 209/365.3; 209/405

(58) Field of Classification Search
CPC .............. B07B 1/28; B07B 1/42; B07B 1/144
USPC ................ 209/257, 365.1, 365.2, 365.3, 405
See application file for complete search history.

(56) References Cited

U.S. PATENT DOCUMENTS

| | | | | | |
|---|---|---|---|---|---|
| 464,776 | A | * | 12/1891 | Pollock | 209/339 |
| 1,495,850 | A | * | 5/1924 | Jacquelin | 74/26 |
| 2,353,492 | A | * | 7/1944 | O'Connor | 366/112 |
| 2,756,973 | A | * | 7/1956 | Dostatni | 74/26 |
| 3,032,175 | A | * | 5/1962 | Thomas | 198/763 |
| 3,202,282 | A | * | 8/1965 | Ruzicka | 209/365.3 |
| 3,347,373 | A | * | 10/1967 | Dahlberg | 209/315 |
| 4,152,255 | A | * | 5/1979 | Musschoot | 209/234 |
| 4,180,458 | A | * | 12/1979 | Shahan | 209/326 |
| 4,272,366 | A | * | 6/1981 | Dean et al. | 209/364 |
| 5,094,342 | A | * | 3/1992 | Kraus et al. | 198/761 |
| 5,178,259 | A | * | 1/1993 | Musschoot | 198/753 |
| 5,494,173 | A | * | 2/1996 | Deister et al. | 209/326 |
| 6,782,995 | B2 | * | 8/2004 | Didion et al. | 198/750.8 |
| 2008/0217219 | A1 | * | 9/2008 | Naberg et al. | 209/698 |

* cited by examiner

*Primary Examiner* — Joseph C Rodriguez
(74) *Attorney, Agent, or Firm* — Simmons Perrine Moyer Bergman PLC

(57) ABSTRACT

A compact mobile variable angle vibrating screen with a suspension and dampening system configured to accommodate variable angles and exhibit acceptable vibration levels; especially during power up and power down surge vibration at the variable angles. The system comprises a group of bi-directional dual pivot leg vibration damper mechanisms which are effective only during times of excessive vibration such as during the power up and power down vibration surges.

16 Claims, 5 Drawing Sheets

PRIOR ART

VIBRATING SCREEN SUSPENSION SYSTEMS

CROSS REFERENCE TO RELATED APPLICATIONS

This application claims the benefit of a provisional application filed on Nov. 8, 2010, having Ser. No. 61/411,120; and a provisional application filed on May 12, 2011, having Ser. No. 61/485,204; and a provisional application filed on Aug. 10, 2011, having Ser. No. 61/522,016; all three provisional applications are hereby incorporated herein in their entirety by this reference.

BACKGROUND OF THE INVENTION

This invention relates to vibrating screens and more particularly to suspension and damping systems for vibrating screens.

The aggregate industry utilizes many styles of screen machines to sort aggregates by size. Most screen machines utilize vibration to agitate the mixture of aggregates to promote separation through various sized openings in the screening surfaces. Sorting is achieved by undersized particles passing through the openings in the screening surface and the oversize particles being retained above the screen surface. These machines usually have some type of vibrating mechanism to shake the unit and its screening surfaces. The vibrating mechanisms usually include an unbalanced weight mounted on one or several rotating shafts which when rotated, force a cycling motion into the screen machine. The resulting motion can have a circular path, linear path, elliptical path, or any combination of those shapes. This cycling motion is referred to as the screen stroke and can range in total displacement in any direction from less than ¼" to more than 1".

These screen machines are normally supported on springs which isolate the vibrating machine from the mounting structure.

Fixed inclined screens are constructed so the screen surfaces are sloped, usually toward the discharge end, to aid material movement to the end and off the screen. These vibrating screens are usually supported with four springs or spring groups, one each at the corners of the screen. The springs are usually mounted in a vertical orientation.

Sometimes a screen is designed to be operated in various sloped positions. This is frequently found in portable equipment that requires a lower profile for travel as well as multiple sloped positions as needed for various screening applications.

Now referring to FIG. 1, in the case of a screen that must operate at various sloped positions, vertically mounted springs 14 and 16 would become tilted with the change of slope and become unstable. Therefore, the springs in this case are typically oriented so they are tilted towards each other within the spring grouping 10 to provide spring stability as the support frame 12 changes slope. These are also commonly found in two spring groups, or in an alternate arrangement with a center vertical spring.

The overall spring rate, or stiffness, of the spring groups are affected as the support frame changes slope. All the spring groups change together as the slope changes. If the center of gravity of the screen is above a plane that goes through the spring attachment points, there will be a shift of weight to the discharge end of the screen as the slope increases. It would be desired to have the spring groups on that end to increase stiffness to help support the weight shift. Even if the center of gravity is on the plane through the spring attachments, the heavy load of unsorted material on the upper levels will raise the mass center of the screen which will shift more weight to the discharge spring groups as the slope increases.

In order to provide significant isolation from the mounting structure, the spring suspension has a sufficiently low spring rate to minimize vibration transmittance into the mounting structure. The natural frequency of the spring supported machine is lower than the vibration frequency in order to provide isolation. Since the spring natural frequency is lower than the operating frequency, the machine must pass through the natural frequency speed range during start up and shut down. When the machine passes through the suspensions natural frequency range, that motion becomes amplified and the movement of the screen body becomes much larger than the motion (stroke) during normal operation. This large motion or surge causes higher forces and stresses to the screen and support structure which can cause damage to both.

It is desired to employ a mechanism to dampen the surge during that start up and shut down sequence. There are various styles of damping methods used today, most utilizing some type of friction device to dissipate some of the energy during the surge. Most devices used today either require continual maintenance or dampens only vertical motion. There are mechanisms in the industry today that utilize a yoke type containment device and a single pivot link. These only contact the screen body stub post when moving vertically, not horizontally.

Since it is an elongated yoke, it makes point contact on a horizontal surface rather than the rounded surfaces of the containment cup. The yoke style also does not provide horizontal containment. See FIG. 2.

Consequently, there is a need for improvement in suspension and damping systems for vibrating screens.

SUMMARY OF THE INVENTION

More specifically, an object of the invention is to provide a cost effective vibrating screen.

It is a feature of the present invention to include inwardly angled non-vertically oriented internally parallel spring groups.

It is an advantage of the present invention to reduce the space requirements for attachment of the spring groups to the base frame, thereby increasing design options which meet the compactness requirements for highway transportation.

It is another object of the present invention to decrease problems which are associated with excess vibration of the screen when the operating frequency equals or is lower than the natural frequency of the springs.

It is another feature of the present invention to only include a bi-directional dual pivot friction damping control system.

It is another advantage of the present invention to provide a reduction in problems associated with operating the screen at a frequency below the natural frequency of the springs.

The present invention includes the above-described features and achieves the aforementioned objects.

Accordingly, the present invention comprises a vibrating screen suspension and damping system which includes inwardly inclined internally parallel spring pairs and/or a dual pivot bi-directional damping mechanism.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
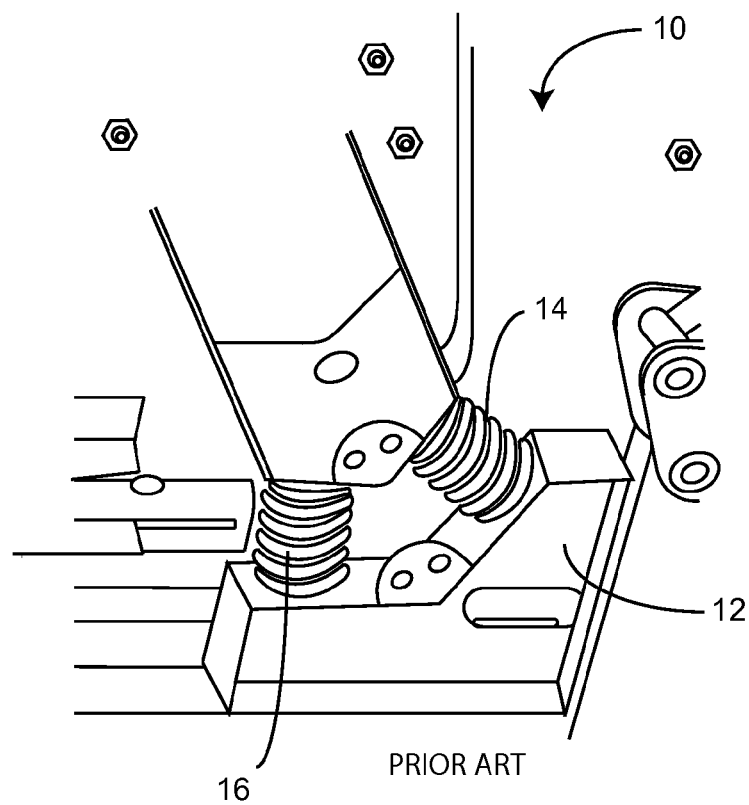
FIG. 1 is a perspective view of the of a internally inwardly angled spring group of the prior art.
Figure 2:
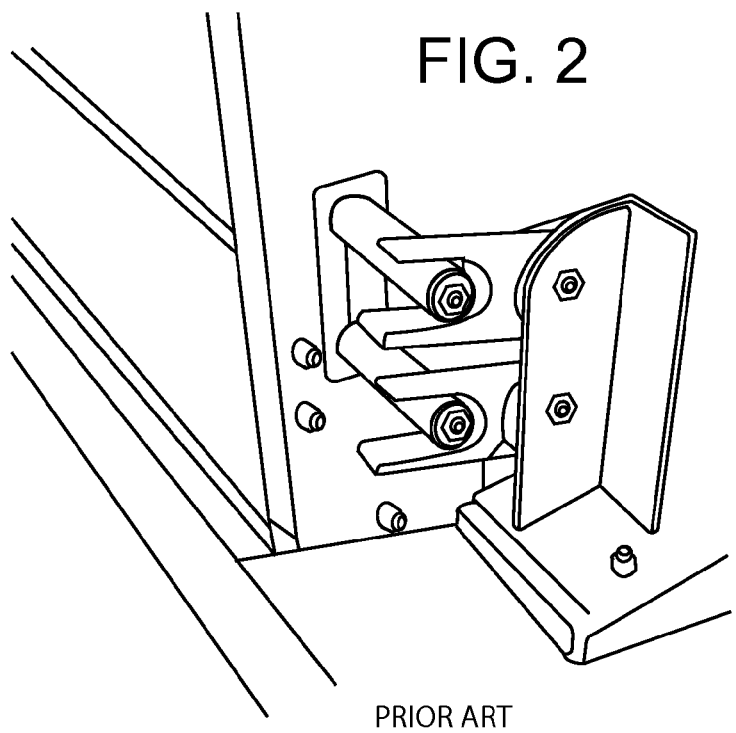
FIG. 2 is a perspective view of a pair of single pivot unidirectional friction damping structures of the prior art.
Figure 3:
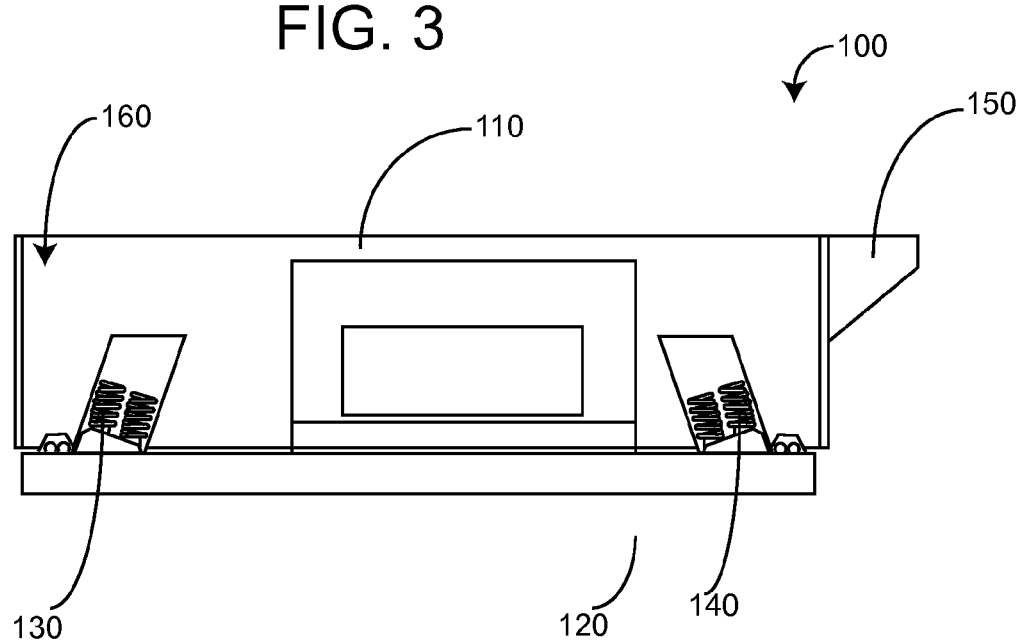
FIG. 3 shows a side view a vibrating screen of the present invention deployed in a horizontal position.

Referring now to the drawings, where like numerals refer to like matter throughout, and more particularly to FIG. 3, there is shown a system of the present invention which includes a vibrating screen box 110 which is supported by discharge spring group 130 & feed end spring group 140 on the support frame 120. In this example, the feed end spring group 140 is tilted so the top of the springs angle toward the discharge end. The discharge spring group 130 is tilted toward the feed end 150. The opposed spring groups push the screen box between the two groups to provide stability when the screen base slope changes. These spring groups are mirrored on the opposite side of the screen and are coupled to the support frame 120 so as to allow the vibrating screen box 110 to vibrate, yet isolate the support frame from much of the vibration.

Figure 4:
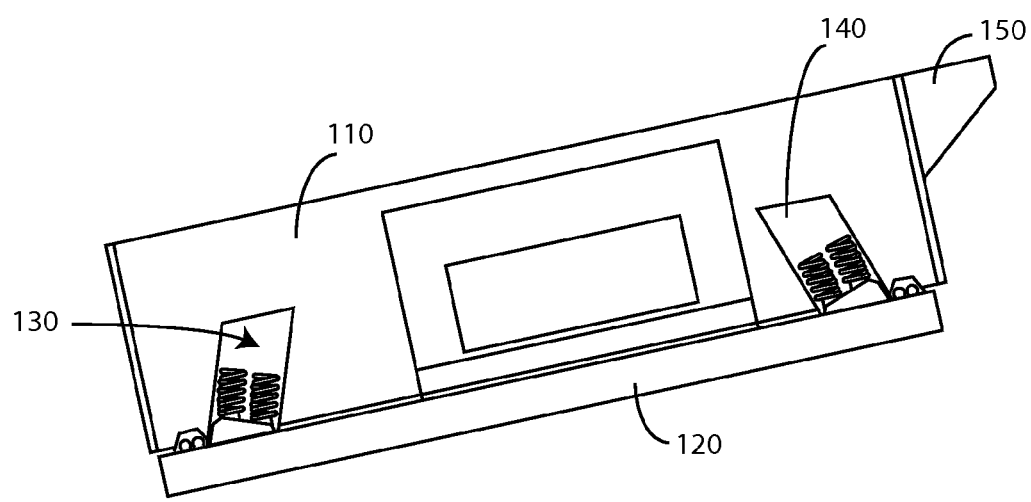
FIG. 4 shows a side view a vibrating screen of FIG. 3 deployed in an inclined position.

Now referring to FIG. 4 there is shown an example where the support frame 120 is repositioned to a desired sloped position. The discharge spring group 130 now has the center axis of the springs positioned closer to vertical which increases their effective vertical spring stiffness.

The springs can be designed so that the natural frequency of the screen on the springs is such that it can amplify the stroke of the screen, making it more active. The amplification effect is related to how close the natural frequency is to the operational speed. The closer the suspension natural frequency is to the operational speed, the more amplification there will be. The stiffer the springs, the higher the suspension's natural frequency.

If more action is desired on the discharge end as weight is shifted toward that end as slope increases, those springs stiffness and orientation can be established so that as the slope increases, the increased spring stiffness will produce more motion amplification on the discharge end of the screen.

Figure 5:
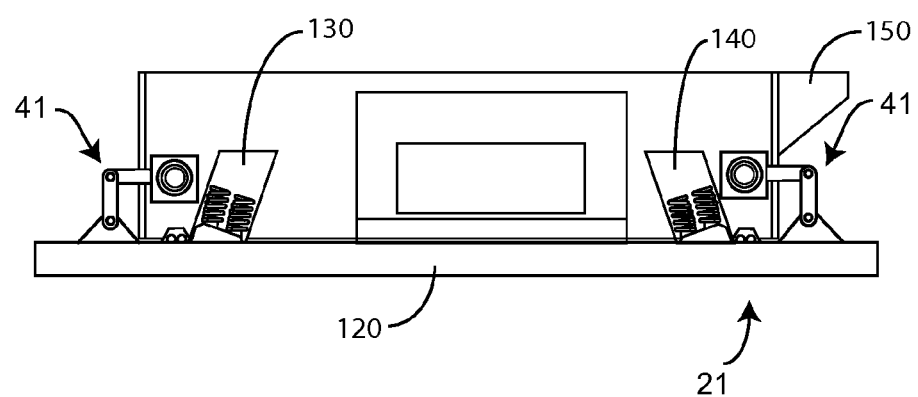
FIG. 5 shows a side view of a vibrating screen of FIGS. 3 and 4 with dual pivot damper of the present invention.

Now referring to FIG. 5 there is shown a vibrating screen of FIGS. 3 and 4 together with the dual pivot damper of the present invention. More particularly there is shown:

a side view of the vibrating screen supported on springs groups 130 and 140 on a support structure. The opposing dual pivot vibration damper mechanisms 41 are located on opposite ends. The screen motion is planer to this view. There are mirror images of these vibration dampers on the opposite side, in a parallel plane, symmetrically positioned about a central plane.

Figure 6:
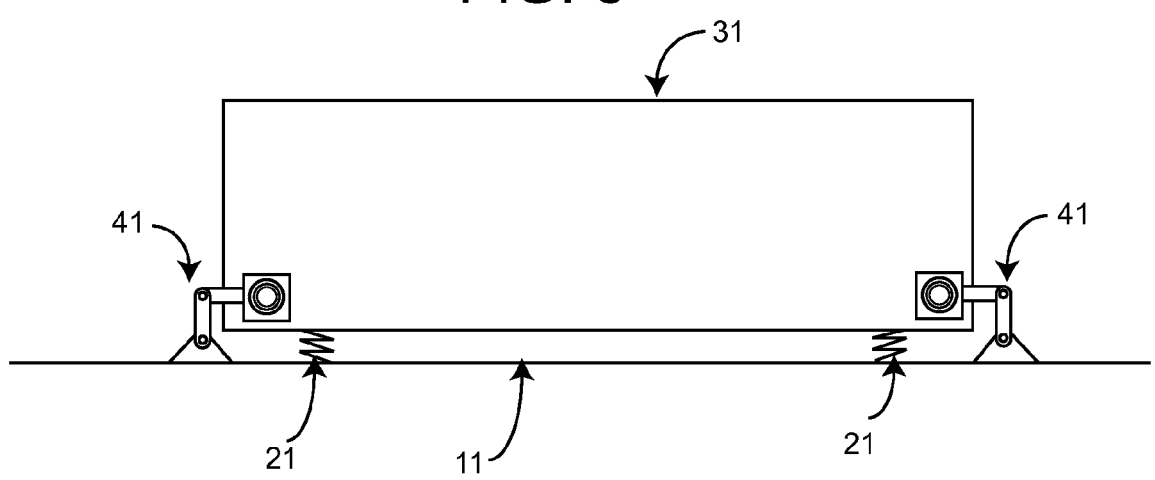
FIG. 6 shows a typical vibrating screen in combination with a dual pivot damper of the present invention, in a typical at rest orientation.

Now referring to FIG. 6 there is shown a more typical horizontal vibrating screen together with the dual pivot damper of the present invention, including a side view of a horizontal type screen 31 supported on springs 21, on a support structure 11. The opposing dual pivot vibration damper mechanisms 41 are located on opposite ends.

Figure 7:
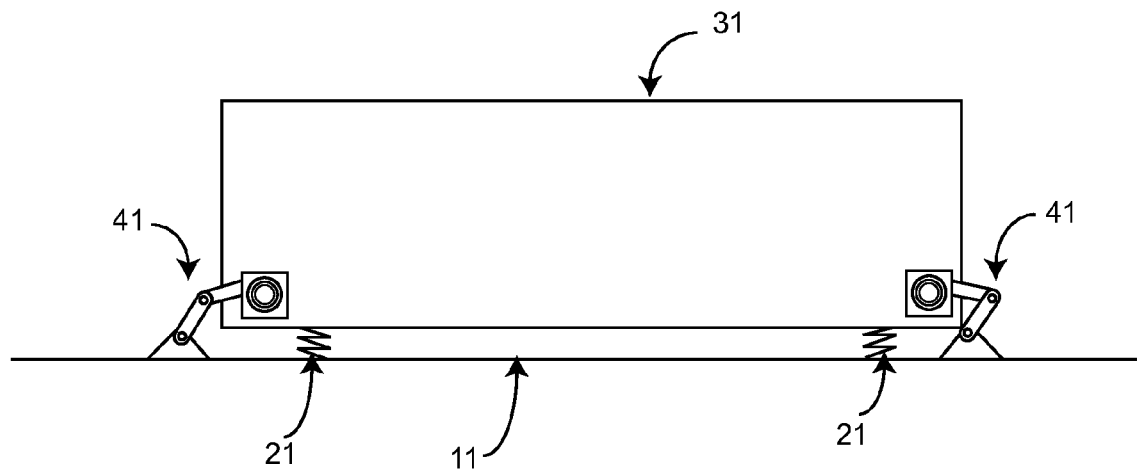
FIG. 7 shows a typical vibrating screen in combination with a dual pivot damper of the present invention, in an orientation which is displaced from an at rest orientation.

Now referring to FIG. 7 there is shown a screen displaced to the right, the left damper has the link nearly aligned which provides a "hard" link to prevent further movement, preventing the unit from falling off the springs.

Figure 8:
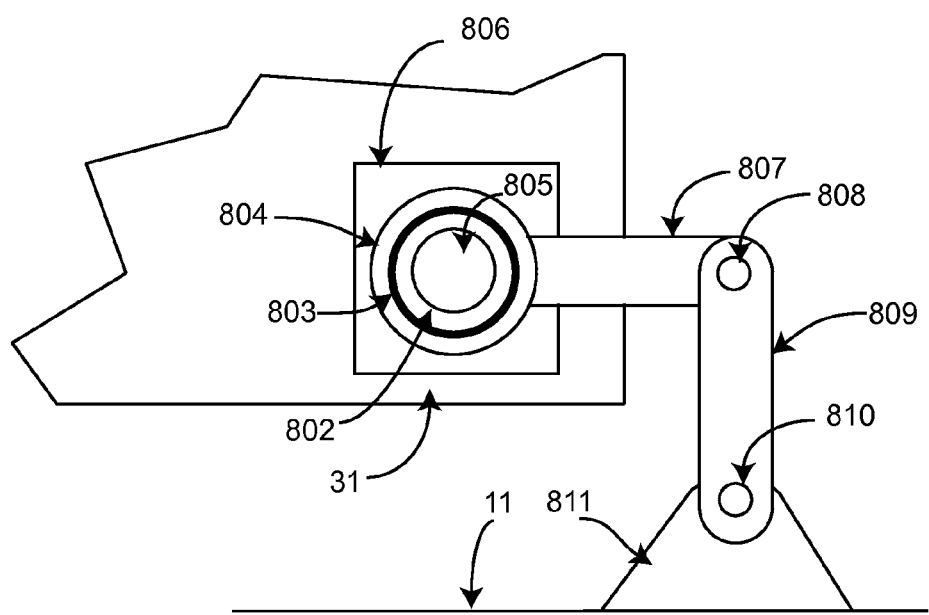
FIG. 8 shows a more detailed view of the damper mechanism of FIGS. 5-7.

Now referring to FIG. 8 there is shown a more detailed view of the dual pivot damper 41 of FIGS. 5-7 including:

A vibrating screen body 31; some clearance 802 inside the containment cup 804 (outer face removed to show internal clearance) and its resilientiner 803, such as UHMW polyethylene or nylon to the stub post 805 attached to stub post mounting plate 806 which is attached to screen body 31; upper pivot link 807 attached to containment cup 804 and pivot hinge 808 and lower link 809 which is attached to base pivot 810 and there to pivot base 811. Note, resilient liner could be substituted with a covering or sleeve over the stub post 805.

The clearance 802 may be larger than the stroke of the screen body. If the screen body is designed to move on a linear stroke of ¾" total movement that is +/−⅜" the clearance would be slightly larger than ⅜" so that the high frequency motion of the screen body is not influenced by the damper. The damper will be pushed to a neutral position by the action of the screen body where it will remain due to the friction of the joints. This makes the damper position self adjusting, self neutralizing, under varying loads. Self adjusting is important since heavier loads in the screen body will compress the support springs more, lowering the position of the screen body during operation.

Figure 9:
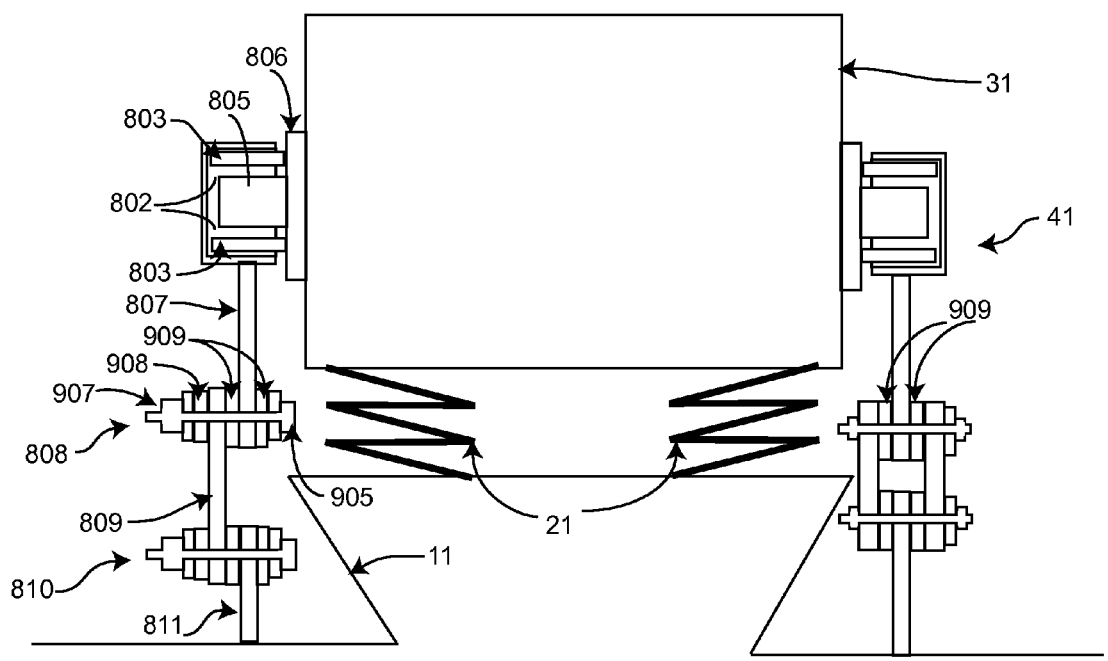
FIG. 9 shows a simplified view of a vibrating screen of the present invention with enlarged details of the dual pivot damper mechanism of the present invention.

Now referring to FIG. 9, which shows an end view of the screen 31 and the mirrored vibration dampers on opposing sides. Motion is perpendicular to the image. The support structure line is shown on multiple levels to allow showing the damper pivot arms straightened out for clarity. The damper on the RH side is slightly different showing a dual lower link configuration, while the LH side shows a single lower link with friction plates on both sides of the pivot hinges. These would be the same in practice and only shown this way to show different possible arrangements.

More specifically there is shown: a support structure 11 line (shown at multiple levels for clarity) but a single level support is preferred. Also shown is a pivot base (rigidly attached to support structure 811; a lower pivot link 809 tying upper pivot link 807 to pivot base 811; outer pivot plates with a hinge bolt 905 therethrough.

Also shown are screen springs 21 supporting spring box 31 above support structure 11 and a hinge bolt nut 907 to preload compression spring 908, which is used to maintain pressure on friction plates 909. Also shown is upper pivot link 807 tying containment cup (shown with outer cover plate); to lower pivot link 809 with clearance 802 between containment cup sleeve or rubber like liner 803 and screen stub post 805 which is rigidly attached to stub post mounting plate 806 which is rigidly attached to screen body 31.

It is believed that when these teachings are combined with the known prior art by a person skilled in the art of boom truck design and equipment manufacture, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

We claim:

1. A vibrating screen comprising:
   a support structure which is configured to be transported on a highway and is configured to be adjusted to *variable* angles;
   a vibrating screen configured for sorting aggregate by size;
   a pair of internally parallel spring groups, the pair being arranged in an angled orientation toward a central location; so as to oppose the other, each of said pair being coupled to both said support structure and said vibrating screen;
   a dual pivot damping system configured for damping vibration in two orthogonal axes;
   wherein said dual pivot damping system comprises:
      a screen connection; on said vibrating screen;
      a base connection on said supporting structure; and
      a plurality of pivoting leg members coupled in series between said screen connection and said base connection; and
      where a plurality of pivoting leg members are disposed adjacent a readily replaceable friction plate.

2. A vibrating screen comprising:
   a support structure which is configured to be transported on a highway and is configured to be adjusted to variable angles;
   a vibrating screen configured for sorting aggregate by size;
   a pair of internally parallel spring groups, the pair being arranged in an angled orientation toward a central location; so as to oppose the other, each of said pair being coupled to both said support structure and said vibrating screen;
   a dual pivot damping system configured for damping vibration in two orthogonal axes;
   further comprising a means for providing resistance to motion in two directions above predetermined limits.

3. The screen of claim 2 wherein said dual pivot damping system is a self adjusting and self neutralizing system and said plurality of pivoting leg members having rotation limit to prevent from going over center.

4. The screen of claim 2 wherein said means for providing resistance comprises:
   a containment cup coupled to said plurality of pivoting leg members; and
   a stub post coupled to the screen and disposed in part within said containment cup.

5. The screen of claim 4 further comprising a resilient member disposed within said containment cup for cushioning, reducing wear on said containment cup and said stub post.

6. The screen of claim 5 wherein said resilient member is a readily replaceable rubber like sleeve and is available in various dimensions so as to provide for an adjustment in clearance amounts which is slightly larger than a stroke of the vibrating screen in normal operation.

7. The screen of claim 6 wherein the sleeve is a cushion that is resilient to permanent deformation and returns to original shape after contact with said stub post and said containment cup.

8. A vibrating screen comprising:
   a support structure which is configured to be hydraulically adjusted to *variable* angles;
   a multi-deck vibrating screen configured for sorting aggregate by size;
   a plurality of springs arranged in groups, each of said plurality of springs arranged as to oppose another of said plurality of springs, each of said plurality of springs being coupled to both said support structure and said vibrating screen;
   a dual pivot damping system configured for damping vibration in two orthogonal axes comprising:
   a screen connection; on said vibrating screen;
   a base connection on said supporting structure; and
   a plurality of pivoting leg members coupled in series between said screen connection and said base connection.

9. The screen of claim 8 where said plurality of pivoting leg members are disposed adjacent a readily replaceable friction plate.

10. The screen of claim 9 further comprising a means for providing resistance to motion in two directions above predetermined limits.

11. The screen of claim 10 wherein said dual pivot damping system is a self adjusting and self neutralizing system and said plurality of pivoting leg members having rotation limit to prevent from going over center.

12. The screen of claim 10 wherein said means for providing resistance to motion comprises:
   a containment cup coupled to said plurality of pivoting leg members; and
   a stub post coupled to the screen and disposed in part within said containment cup.

13. The screen of claim 12 further comprising a resilient member al least partially located within said containment cup for cushioning, reducing wear on said containment cup and said stub post.

14. The screen of claim 13 wherein said resilient member is a readily replaceable rubber like sleeve coupled to said containment cup and is available in various dimensions so as to provide for an adjustment in clearance amounts which is slightly larger than a stroke of the vibrating screen in normal operation.

15. The screen of claim 14 wherein the sleeve is a cushion that is resilient to permanent deformation and returns to original shape after contact with said stub post and said containment cup.

16. A vibrating screen comprising:
   a support structure which is configured to be hydraulically adjusted to *variable* angles;
   a multi-deck vibrating screen configured for sorting aggregate by size;
   a plurality of springs arranged in groups, each of said plurality of springs arranged as to oppose another of said plurality of springs, each of said plurality of springs being coupled to both said support structure and said vibrating screen;
   a dual pivot damping system configured for damping vibration in two orthogonal axes comprising:
   a screen connection; on said vibrating screen;
   a base connection on said supporting structure;
   a plurality of pivoting leg members coupled in series between said screen connection and said base connection;
   where said plurality of pivoting leg members are disposed adjacent to a readily replaceable friction plate;
   a containment cup coupled to said plurality of pivoting leg members;
   a stub post coupled to the screen and disposed in part within said containment cup; and a resilient member disposed within said containment cup for cushioning, reducing wear on said containment cup and said stub post; wherein said resilient member is a rubber like sleeve that is resilient to permanent deformation and returns to original shape after contact with said stub post and said containment cup.

\* \* \* \* \*